United States Patent [19]

Stewart et al.

[11] Patent Number: 5,080,411

[45] Date of Patent: Jan. 14, 1992

[54] VEHICLE BUMPER STRUCTURE

[75] Inventors: Robert L. Stewart, Rochester Hills; Alan J. Osterman, Bloomfield Hills; Dennis W. Jalbert, Mt. Clemens, all of Mich.

[73] Assignee: Chrysler Corporation, Highland Park, Mich.

[21] Appl. No.: 684,733

[22] Filed: Apr. 15, 1991

[51] Int. Cl.⁵ .............................................. B60R 19/22
[52] U.S. Cl. ..................................... 293/122; 293/102
[58] Field of Search ............... 293/102, 120, 121, 122, 293/154, 155; 296/146, 188; 138/171, 173, DIG. 11; 52/731

[56] References Cited

U.S. PATENT DOCUMENTS

| | | | |
|---|---|---|---|
| D. 134,943 | 2/1943 | Mitchell | 293/102 X |
| 1,317,112 | 9/1919 | Wasson | 293/102 |
| 1,410,353 | 3/1922 | Wernig | 293/102 |
| 1,424,359 | 8/1922 | Isgrig | 293/102 |
| 1,541,572 | 6/1925 | Ivins | 293/122 X |
| 1,966,453 | 7/1934 | Lyon | 293/102 X |
| 3,905,630 | 9/1975 | Cantrell | 293/102 |
| 4,010,969 | 3/1977 | Cantrell et al. | 293/102 |
| 4,599,843 | 7/1986 | Ingvarsson | 52/731 X |
| 4,961,603 | 10/1990 | Carpenter | 293/102 |

FOREIGN PATENT DOCUMENTS

| | | | |
|---|---|---|---|
| 172848 | 10/1982 | Japan | 293/120 |
| 105850 | 6/1983 | Japan | 293/102 |

OTHER PUBLICATIONS

Borchelt et al., "Application of Empirical Relationship Developed for Ultra-High Strength Steels in Bumper Design", *Society of Automotive Engineers*, SAE Paper No. 900737, Feb. 1990.

Borchelt et al., "Design of Ultra-High Strength Sheet Steel Beams", *Society of Automotive Engineers*, SAE Paper No. 900428, Feb. 1990.

Borchelt et al., "Placing Sweep in Ultra-High Strength Sheet Steel Beams", *Manufacturing International '90*, Inland Steel Company, 1990.

Golze et al., "Bumper Design, Materials, and Fabrication", *Society of Automotive Engineers*, SAE Paper No. 730030, Jan. 1973.

*Primary Examiner*—Margaret A. Focarino
*Assistant Examiner*—Andrew C. Pike
*Attorney, Agent, or Firm*—Edward A. Craig

[57] ABSTRACT

A bumper structure includes an elongated rollformed tubular vehicle bumper beam. The bumper beam is fabricated of ultra-high strength steel and has a plan view sweep value of more than 10. A relatively thick layer of energy absorbing foam material covered by a facia overlies the bumper beam. The foam material is thickest at the center portion and decreases in thickness towards the longitudinal ends of the bumper beam.

8 Claims, 5 Drawing Sheets

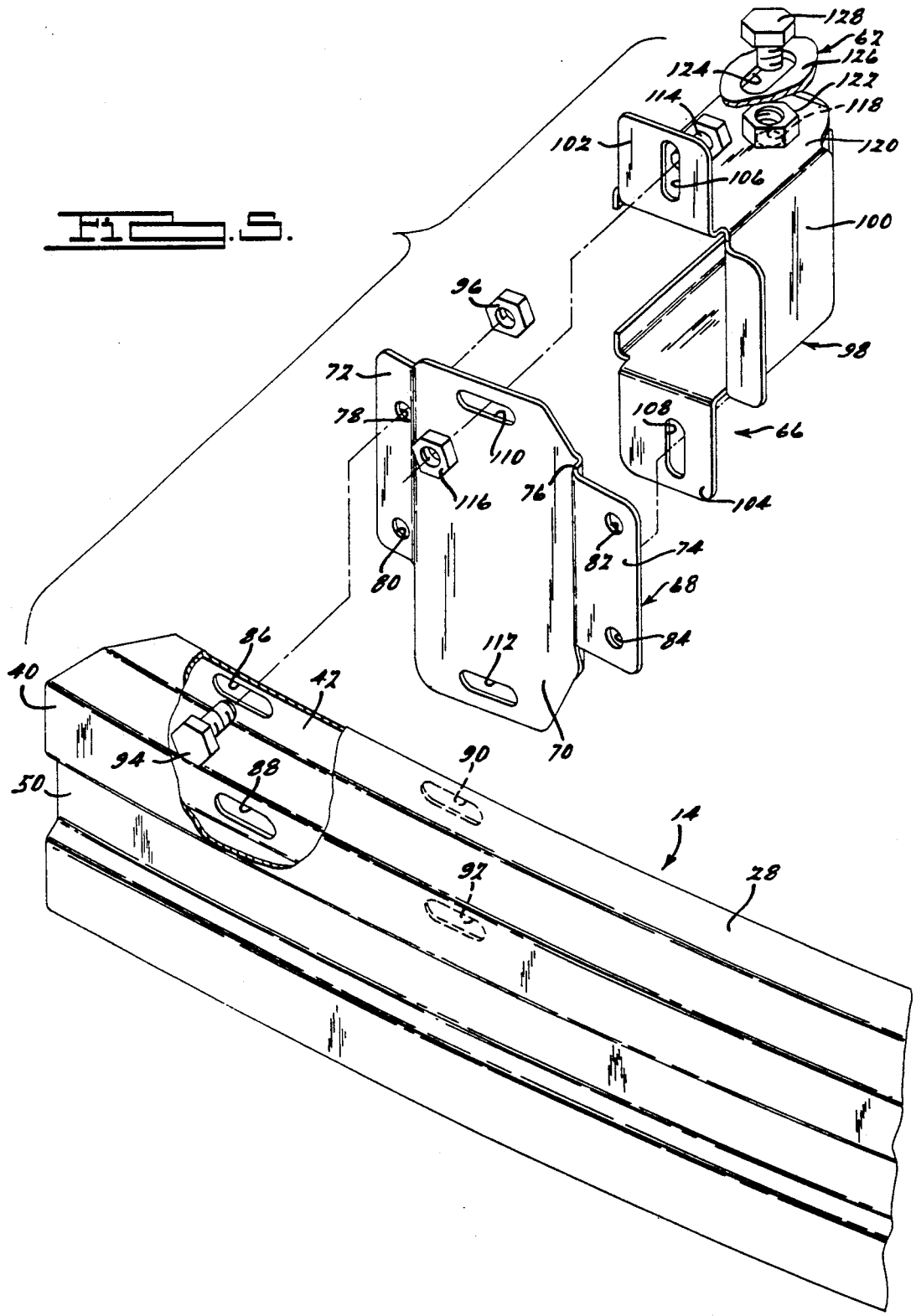

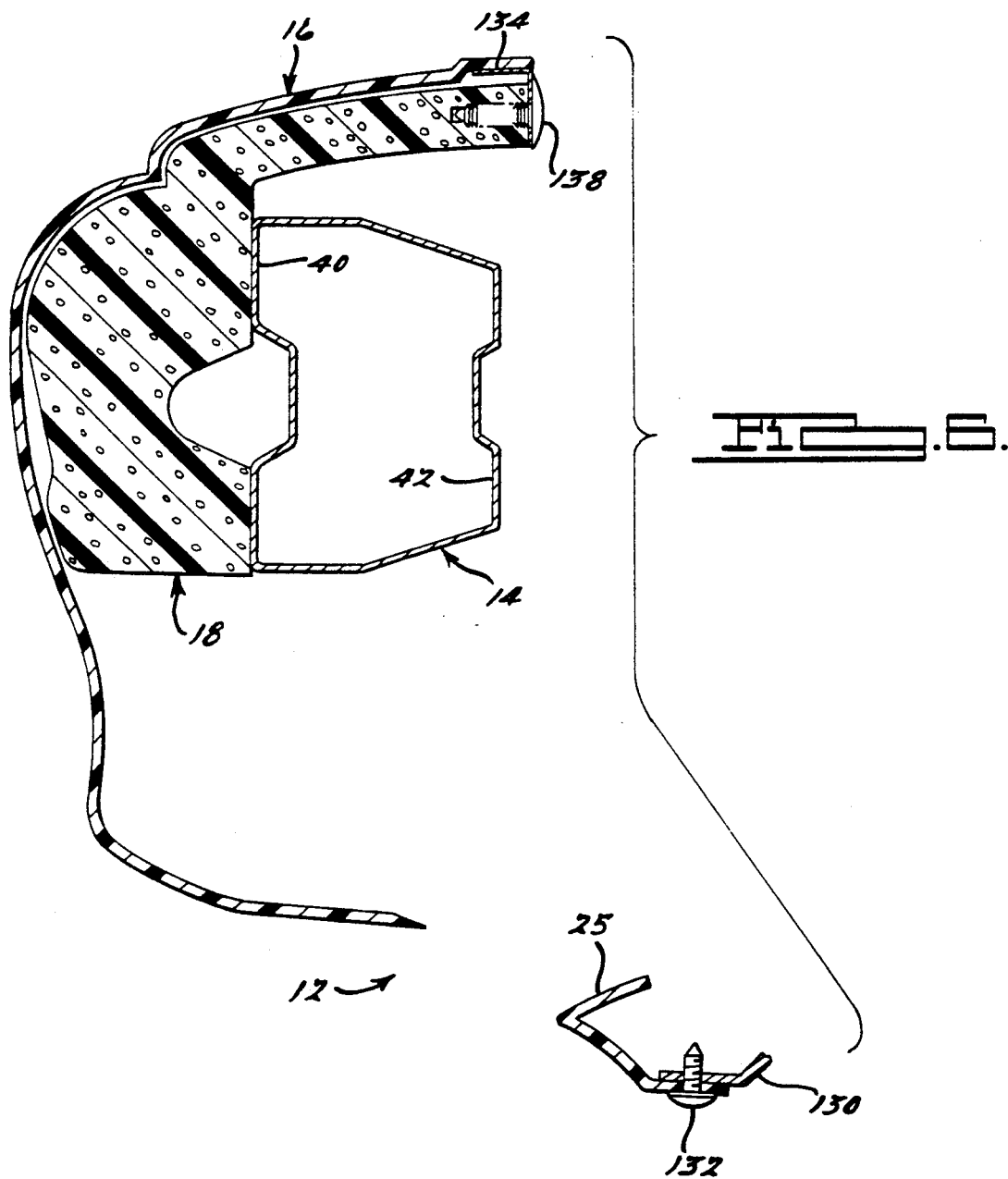

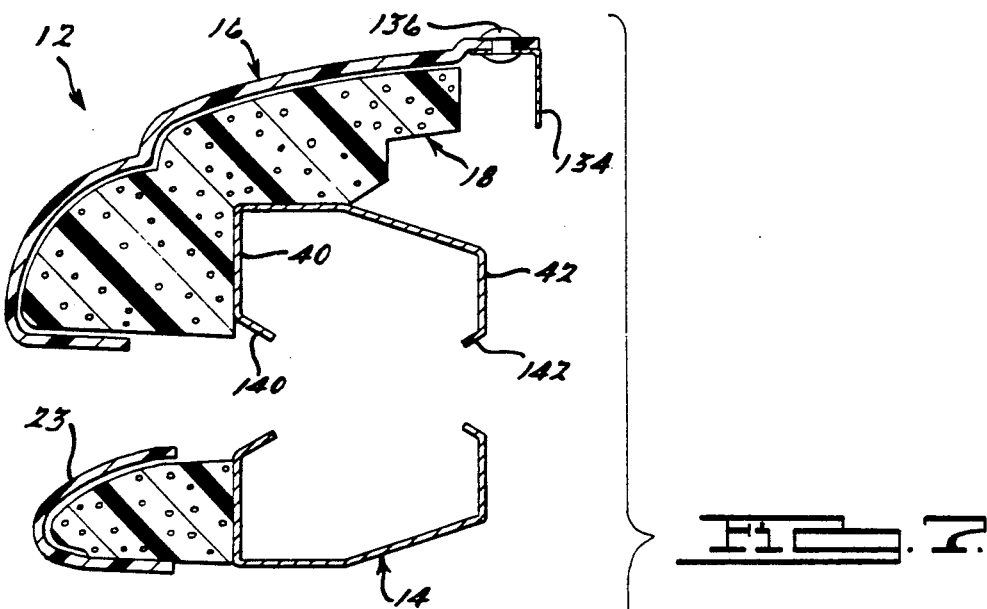
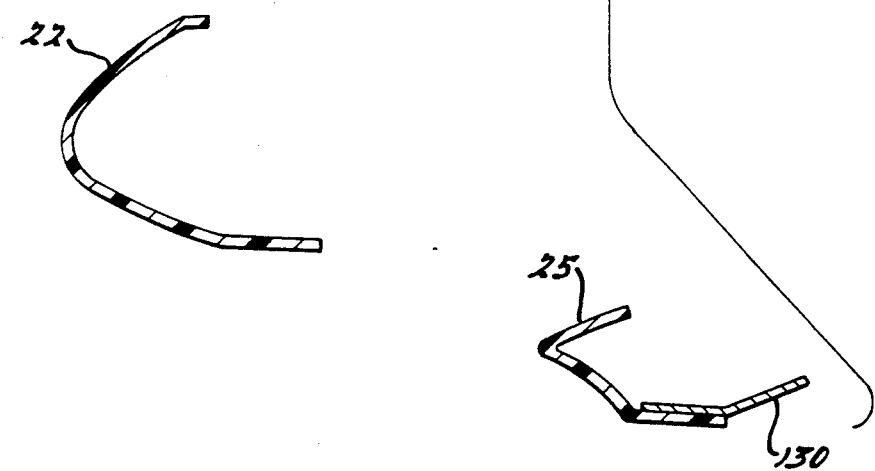
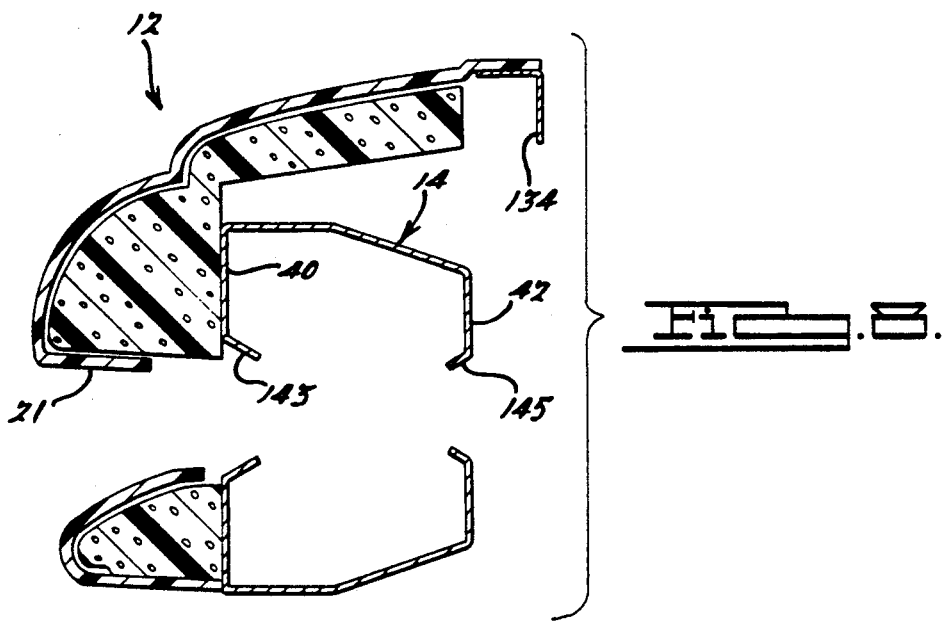

VEHICLE BUMPER STRUCTURE

BACKGROUND OF THE INVENTION

1. Field of the Invention

This invention relates to a vehicle bumper structure which includes a bumper beam fabricated of ultra-high strength steel and having a plan view sweep value of more than 10. A layer of energy absorbing foam covered by a facia overlies the bumper beam.

2. Description of Prior Art

It has been desired to fabricate bumper beams for vehicles, particularly cars, which are made of high-strength steel. It has been difficult to form such bumper beams out of high-strength steel because bumper beams of the type currently in use require a curvature. It is necessary to rollform such bumper beams to obtain the desired curvature. However, when high-strength steel is rollformed into desired curvature, the material of the beams has been damaged in the process resulting in unacceptable quality. The high-strength obtainable with such steels is desired in order to provide a bumper beam which can be impacted at speeds up to five miles per hour without damage being suffered.

Steel is generally characterized as iron that contains carbon in an amount up to about 1.7 percent as an essential alloying constitute. Other materials are frequently used as additional alloying constituents in steel to achieve desired properties in the final composition.

Low carbon mild steels are relatively ductile and therefore facilitate manufacturing forming processes, such as stamping. Mild steels are widely used in numerous applications which do not require high strength. It is, however, desired for certain applications where high strength is needed to use higher carbon steels, frequently alloyed with other constitutes. Such steels are characterized as "high-strength steels". Within this category there is a class defined as "ultra-high strength steel". Such steel has a minimum yield strength of 100 ksi (100 thousand pounds per square inch). Chemical compositions for such steels vary from one producer to another. Different compositions and thermo-mechanical processing may produce equivalent results. Formability o high strength steels is more difficult than with low carbon mild steels because of greater springback and reduced ductility.

It has been desired to use ultra-high strength steels in vehicle bumper design as set forth in Society of Automotive Engineers paper entitled "Application of Empirical Relationship Developed for Ultra-High Strength Steels in Bumper Design" by Borchelt, Shapiro and Subbaraman. As pointed out in this paper, ultra-high strength sheet steel is processed by rollforming because of limited ductility. Current vehicle bumper design requires that bumper beams be curved. This curvature is defined as "sweep". It is desired to fabricate bumper beams having relatively high plan view sweep values (thus greater curvature). However, as pointed out in the paper, current production methods limit the maximum sweep of an ultra-high strength steel bumper beam to a sweep value of 10.

SUMMARY OF THE INVENTION

In accordance with the present invention, a tubular bumper beam design having a box-like crosssection is provided. The bumper beam is fabricated of ultra-high strength steel which may be rollformed to a curvature having a plan view sweep value above 10. This result is believed to be due to the cross-sectional configuration of the bumper beam.

The bumper beam forms part of a bumper structure. A relatively thick layer of energy absorbing foam material covered by a facia overlies the bumper beam. The foam material is thickest at the center portion and thinner towards the ends.

A vehicle bumper structure is provided. The bumper structure includes an elongated rollformed tubular vehicle bumper beam. The bumper beam is fabricated of ultra-high strength steel and has a plan view sweep value of more than 10. The bumper beam has a cross-sectional configuration comprising an upper wall and a lower wall. Each of the upper wall and lower wall has an outer edge and an inner edge. An outer wall interconnects the outer edges of the upper and lower walls and an inner wall connects the inner edges of the upper and lower walls.

A relatively thick layer of energy absorbing foam material overlies the outer wall of the bumper beam. The layer of foam material is thickest at the central portion of the bumper beam and decreases in thickness towards the longitudinal ends of the bumper beam. An exterior facia overlies the outer face of the layer o foam material.

An inner portion of the upper wall is angled downwardly into connection with the inner wall and an inner portion of the lower wall is angled upwardly into connection with the inner wall. The inner wall portions of the upper and lower walls are substantially equal in width, extending from about the mid-point of the upper and lower walls respectively. Preferable, the downward angle of the inner portion of the upper wall is substantially the same number of degrees as the upward angle of the inner portion of the lower wall. The inner and outer walls are preferably substantially vertically oriented with the portions of the upper and lower walls between the inner portions thereof and the outer wall being substantially horizontally oriented. The ultra-high strength steel preferably has a yield strength of at least 120 ksi.

BRIEF DESCRIPTION OF THE DRAWINGS

FIG. 3 is a sectional view taken substantially along the line 3—3 of FIG. 2 looking in the direction of the arrows;

FIG. 5 is an exploded view of the bumper beam and mounting structure;

FIG. 6 is a sectional view taken substantially along the line 6—6 of FIG. 1 looking in the direction of the arrows;

FIG. 7 is a sectional view taken substantially along the line 7—7 of FIG. 1 looking in the direction of the arrows; and FIG. 8 is a sectional view taken substantially along the line 8—8 of FIG. 1 looking in the direction of the arrows.

BRIEF DESCRIPTION OF A PREFERRED EMBODIMENT

Figure 1:
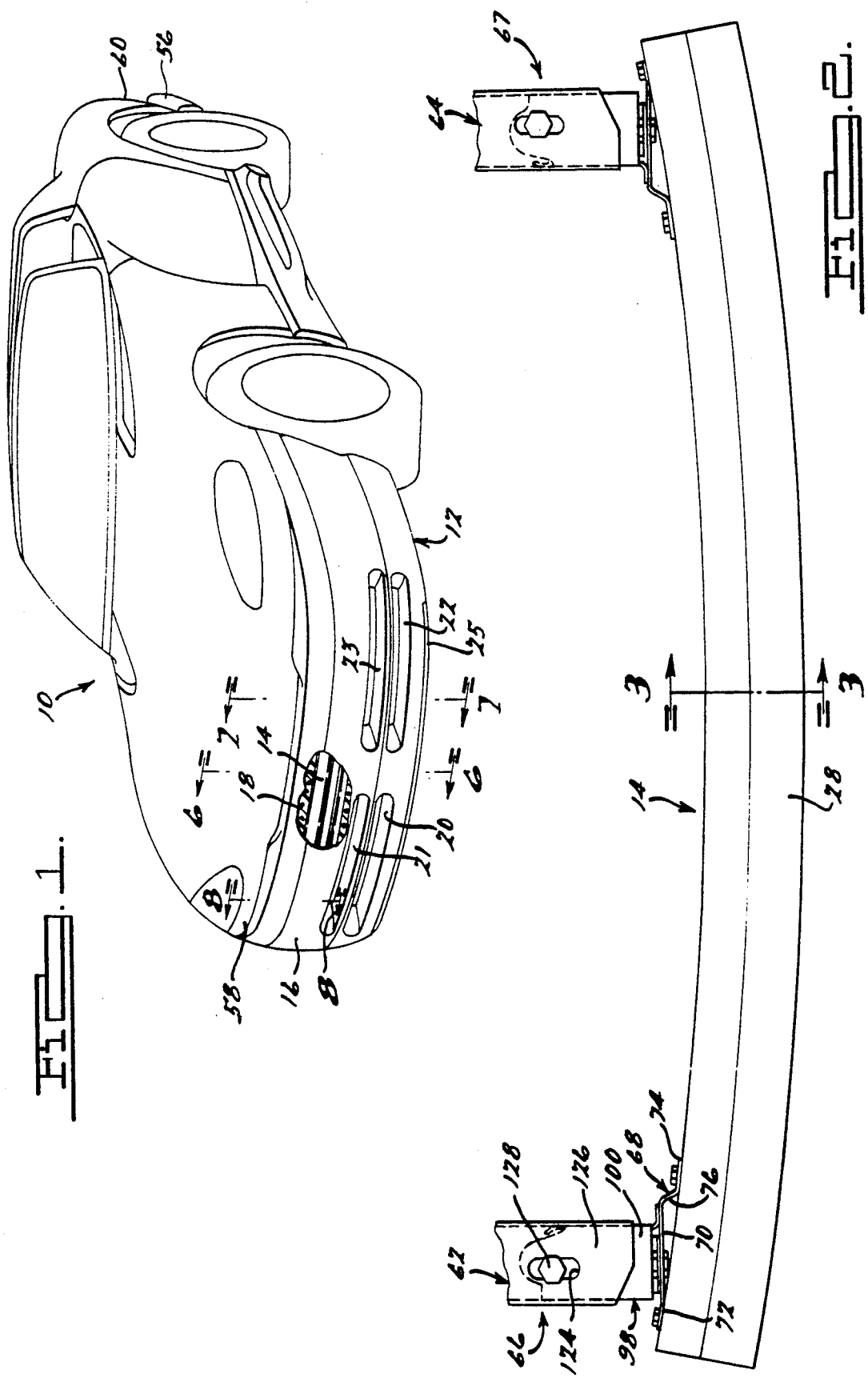
FIG. 1 is a view in perspective of an automobile incorporating a bumper beam in the front bumper structure which forms one embodiment of the present invention.

Referring to FIG. 1, it will be noted that an automobile 10 is illustrated having a front bumper structure 12. As will be noted, the bumper structure 12 is curved from side-to-side of the automobile. A bumper beam 14 is secured to the front of the car. A plastic ornamental facia 16 is secured to the front of the bumper beam 14. Energy absorbing foam material 18, observable behind the broken away portions of the facia 16, is provided between the facia 16 and bumper beam 14. Vent structures 20, 21, 22, 23, 25 are provided in the bumper structure 12 for the passage of air through the bumper structure for the cooling effect it has on the automobile radiator and, when present, air conditioning condenser.

Figure 2:
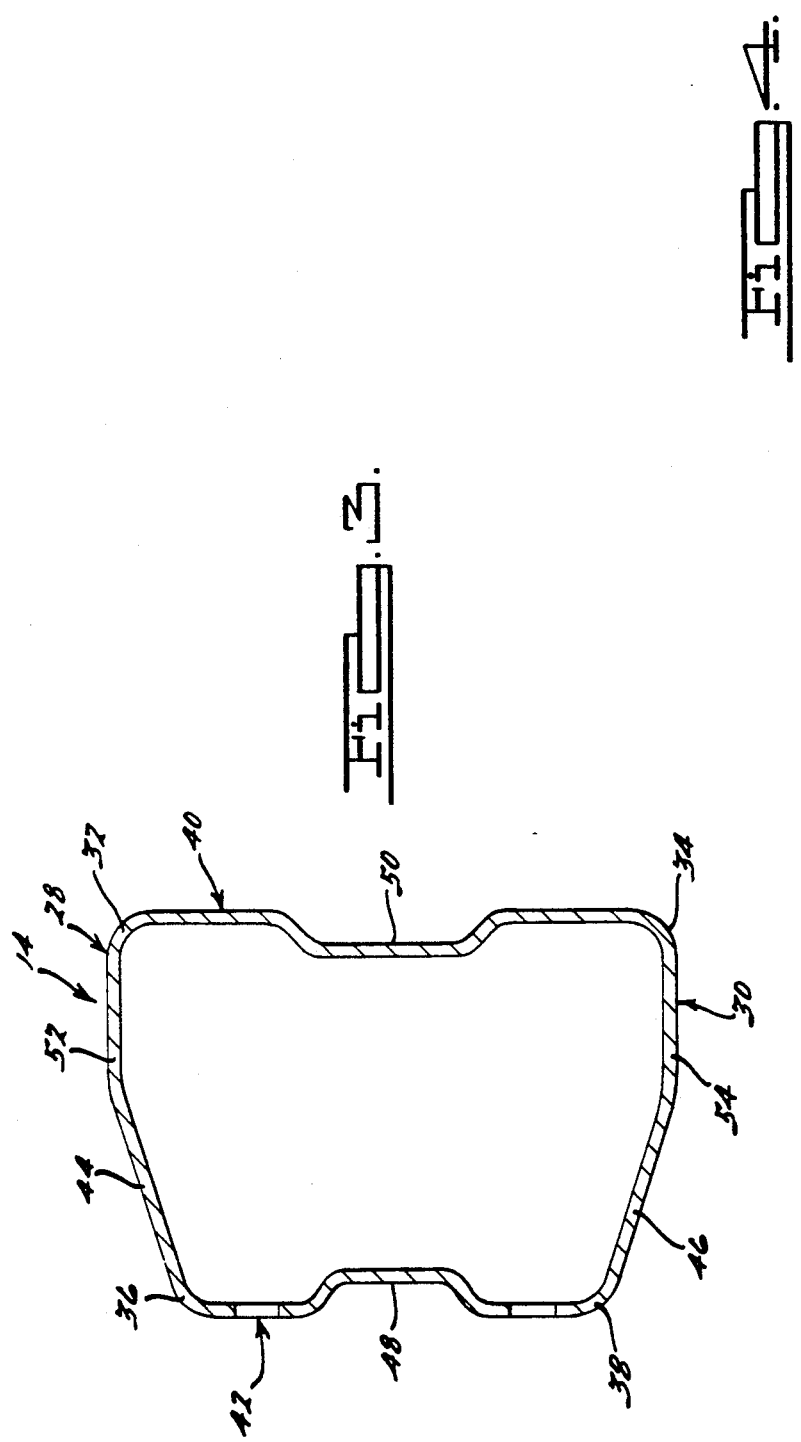
FIG. 2 is a top plan view of the bumper beam used in the automobile of FIG. 1 illustrating the mounting structure for connecting it to the vehicle and with the bumper structure facia and energy absorbing material removed.

Referring to FIG. 2, the bumper beam 14 is an elongated structure which extends substantially from side-to-side of the automobile 10. The wraparound end portions of the facia 16 illustrated in FIG. 1 are not backed up by the bumper beam structure. The bumper beam 14 is curved from end-to-end. This curvature is provided for several reasons. Firstly, the space behind the central portion of the bumper beam resulting from the curvature permits deflection of the bumper beam in the event of impact with another car without damaging structure behind the bumper beam. The bumper beam tends to straighten out when impacted. As will be noted in FIG. 3, the bumper beam has a box-like shape in cross-section. This shape is important in that it increases the strength of the bumper beam and provides dimensional stability. Increase strength permits absorption of energy with consequent reduction in distortion of the bumper beam when it is impacted. Another reason for the bumper beam curvature is to provide room behind the bumper beam for vehicle componentry, such as the radiator. Finally, the curvature of the bumper beam is desirable for aesthetic purposes.

Figure 4:
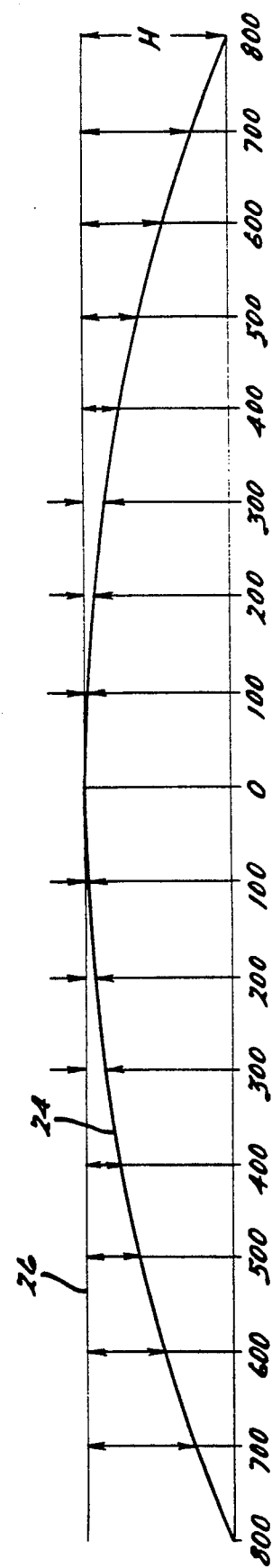
FIG. 4 is a graph illustrating the technique for providing the dimensions necessary to obtain a given sweep value.

In automotive engineering, the bumper beam curvature is defined as "sweep". FIG. 4 and the table which follows illustrate how sweep values are obtained. FIG. 4 illustrates a curve 24 which is a diagrammatic illustration of the sweep or curvature of the bumper beam. The length of the bumper beam is broken into sixteen segments of equal width. The center of the curve is designated as "zero" with the numerals 100, 200, 300, 400, 500, 600, 700, and 800 extending therefrom to the outer ends of the curve 24. The vertical lines indicate the dimension which should be obtained at each location with reference to a horizontal line 26 which is tangent to the zero position. For example, if the sweep value of 10 is desired, the radius of curvature should have a value of 9159.9 millimeters. In one typical example, the front bumper beam is 49 inches long while the rear bumper beam is 50 inches long. The dimensions respecting the distance from the curve 24 to the line 26 are the amount of millimeters indicated for each location. Typically, the 600 line will represent the end of the bumper beam. The dimension in question is identified by the letter "H" which stands for the height of the arc. The present invention permits the use of sweep values of above 10 which has not been achieved with ultra-high strength steel.

| PLANVIEW SWEEP VALUE TABLE Dimensions In Millimeters | | | | | | | | | |
|---|---|---|---|---|---|---|---|---|---|
| SWEEP NO. | RADIUS | 100 | 200 | 300 | 400 | 500 | 600 | 700 | 800 |
| 0.5 | 182880.8 | 0.0 | 0.1 | 0.3 | 0.4 | 0.7 | 1.0 | 1.3 | 1.8 |
| 1.0 | 91441.6 | 0.1 | 0.2 | 0.5 | 0.9 | 1.4 | 2.0 | 2.7 | 3.5 |
| 1.5 | 60962.4 | 0.1 | 0.3 | 0.7 | 1.3 | 2.1 | 3.0 | 4.0 | 5.3 |
| 2.0 | 45723.2 | 0.1 | 0.5 | 1.0 | 1.8 | 2.7 | 3.9 | 5.4 | 7.0 |
| 2.5 | 36580.0 | 0.2 | 0.5 | 1.2 | 2.2 | 3.4 | 4.9 | 6.7 | 8.7 |
| 3.0 | 30484.8 | 0.2 | 0.6 | 1.5 | 2.8 | 4.1 | 5.9 | 8.0 | 10.5 |
| 3.5 | 26131.3 | 0.2 | 0.8 | 1.7 | 3.0 | 4.8 | 6.9 | 9.4 | 12.2 |
| 4.0 | 22866.4 | 0.2 | 0.9 | 2.0 | 3.5 | 5.5 | 7.9 | 10.8 | 14.0 |
| 4.5 | 20327.1 | 0.3 | 1.0 | 2.2 | 3.9 | 6.1 | 8.9 | 12.1 | 15.7 |
| 5.0 | 18296.0 | 0.3 | 1.1 | 2.5 | 4.4 | 6.8 | 10.0 | 13.4 | 17.5 |
| 5.5 | 16634.2 | 0.3 | 1.2 | 2.7 | 4.8 | 7.5 | 10.9 | 14.7 | 19.3 |
| 6.0 | 15249.5 | 0.3 | 1.3 | 3.0 | 5.2 | 8.2 | 11.8 | 16.1 | 21.0 |
| 6.5 | 14078.0 | 0.4 | 1.4 | 3.2 | 5.7 | 8.9 | 12.8 | 17.4 | 22.8 |
| 7.0 | 13074.0 | 0.4 | 1.5 | 3.4 | 6.1 | 9.6 | 13.8 | 18.8 | 24.5 |
| 7.5 | 12204.0 | 0.4 | 1.6 | 3.7 | 6.6 | 10.2 | 14.8 | 20.1 | 26.2 |
| 8.0 | 11442.7 | 0.4 | 1.7 | 3.9 | 7.0 | 10.9 | 15.7 | 21.4 | 28.0 |
| 8.5 | 10771.1 | 0.5 | 1.9 | 4.2 | 7.4 | 11.6 | 16.7 | 22.8 | 29.7 |
| 9.0 | 10174.3 | 0.5 | 2.0 | 4.4 | 7.9 | 12.3 | 17.7 | 24.1 | 31.5 |
| 9.5 | 9640.3 | 0.5 | 2.1 | 4.7 | 8.3 | 13.0 | 18.7 | 25.5 | 33.2 |
| 10 | 9159.9 | 0.6 | 2.2 | 4.9 | 8.7 | 13.7 | 19.7 | 26.8 | 35.0 |
| 11 | 8330.2 | 0.6 | 2.4 | 5.4 | 9.6 | 15.0 | 21.5 | 29.5 | 38.5 |
| 12 | 7639.1 | 0.7 | 2.6 | 5.9 | 10.5 | 26.4 | 23.8 | 32.2 | 42.0 |
| 13 | 7054.5 | 0.7 | 2.8 | 6.4 | 11.3 | 17.7 | 25.6 | 34.8 | 45.5 |
| 14 | 6553.7 | 0.8 | 3.1 | 6.9 | 12.2 | 19.1 | 27.5 | 37.5 | 49.0 |
| 15 | 6119.8 | 0.8 | 3.3 | 7.3 | 13.1 | 20.4 | 29.5 | 40.2 | 52.5 |
| 16 | 5740.4 | 0.9 | 3.5 | 7.9 | 14.0 | 21.8 | 31.4 | 42.8 | 56.0 |
| 17 | 5405.8 | 0.9 | 3.7 | 8.3 | 14.8 | 23.2 | 33.4 | 45.5 | 59.5 |
| 18 | 5108.6 | 1.0 | 3.9 | 8.8 | 15.7 | 24.5 | 35.4 | 48.2 | 63.0 |
| 19 | 4842.8 | 1.0 | 4.1 | 9.3 | 16.5 | 25.9 | 37.3 | 50.9 | 66.5 |
| 20 | 4603.8 | 1.1 | 4.3 | 9.8 | 17.4 | 27.2 | 39.3 | 53.5 | 70.1 |
| 21 | 4387.6 | 1.1 | 4.6 | 10.3 | 18.3 | 28.6 | 41.2 | 56.2 | 73.6 |
| 22 | 4191.3 | 1.2 | 4.8 | 10.8 | 19.1 | 30.0 | 43.2 | 58.9 | 77.1 |
| 23 | 4012.2 | 1.2 | 5.0 | 11.2 | 20.0 | 31.3 | 45.1 | 61.5 | 80.6 |
| 24 | 3848.1 | 1.3 | 5.2 | 11.7 | 20.8 | 32.6 | 47.1 | 64.2 | 84.1 |
| 25 | 3697.3 | 1.4 | 5.4 | 12.2 | 21.7 | 34.0 | 49.0 | 66.9 | 87.6 |
| 26 | 3558.2 | 1.4 | 5.6 | 12.7 | 22.6 | 35.3 | 51.0 | 69.5 | 91.1 |

-continued

PLANVIEW SWEEP VALUE TABLE
Dimensions In Millimeters

| SWEEP NO. | RADIUS | 100 | 200 | 300 | 400 | 500 | 600 | 700 | 800 |
|---|---|---|---|---|---|---|---|---|---|
| 27 | 3429.5 | 1.5 | 5.8 | 13.1 | 23.4 | 36.6 | 52.9 | 72.2 | 94.6 |
| 28 | 3310.2 | 1.5 | 6.0 | 13.6 | 24.3 | 38.0 | 54.9 | 74.9 | 98.1 |
| 29 | 3199.1 | 1.6 | 6.3 | 14.1 | 25.1 | 39.3 | 56.8 | 77.5 | 101.7 |
| 30 | 3095.6 | 1.6 | 6.5 | 14.6 | 26.0 | 40.6 | 58.7 | 80.2 | 105.2 |
| 31 | 2998.9 | 1.7 | 6.7 | 15.0 | 26.8 | 42.0 | 60.6 | 82.8 | 108.7 |
| 32 | 2908.3 | 1.7 | 6.9 | 15.5 | 27.6 | 43.3 | 62.6 | 85.5 | 112.2 |
| 33 | 2823.3 | 1.8 | 7.1 | 16.0 | 28.5 | 44.6 | 64.5 | 88.2 | 115.7 |
| 34 | 2743.4 | 1.8 | 7.3 | 16.5 | 29.3 | 45.9 | 66.4 | 90.8 | 119.2 |
| 35 | 2668.1 | 1.9 | 7.5 | 17.0 | 30.2 | 47.3 | 68.3 | 93.5 | 122.8 |
| 36 | 2597.2 | 1.9 | 7.7 | 17.4 | 31.0 | 48.6 | 70.3 | 96.1 | 126.3 |
| 37 | 2530.1 | 2.0 | 8.0 | 17.9 | 31.8 | 49.9 | 72.2 | 98.8 | 129.8 |
| 38 | 2466.6 | 2.0 | 8.1 | 18.3 | 32.6 | 51.2 | 74.1 | 101.4 | 133.3 |
| 39 | 2406.5 | 2.1 | 8.3 | 18.8 | 33.5 | 52.5 | 76.0 | 104.1 | 136.9 |
| 40 | 2349.5 | 2.1 | 8.5 | 19.2 | 34.3 | 53.9 | 78.0 | 106.7 | 140.4 |
| 41 | 2295.3 | 2.2 | 8.7 | 19.7 | 35.1 | 55.1 | 79.8 | 109.3 | 143.9 |
| 42 | 2243.8 | 2.2 | 8.9 | 20.1 | 35.9 | 56.4 | 81.7 | 112.0 | 147.4 |
| 43 | 2194.8 | 2.3 | 9.1 | 20.6 | 36.8 | 57.7 | 83.6 | 114.6 | 151.0 |
| 44 | 2148.0 | 2.3 | 9.3 | 21.1 | 37.6 | 59.0 | 85.5 | 117.3 | 154.5 |
| 45 | 2103.4 | 2.4 | 9.5 | 21.5 | 38.4 | 60.3 | 87.4 | 119.9 | 158.1 |
| 46 | 2060.9 | 2.4 | 9.7 | 22.0 | 39.2 | 61.6 | 89.3 | 122.5 | 161.6 |
| 47 | 2020.1 | 2.5 | 9.9 | 22.4 | 40.0 | 62.9 | 91.2 | 125.2 | 165.2 |
| 48 | 1981.2 | 2.5 | 10.1 | 22.8 | 40.8 | 64.1 | 93.0 | 127.8 | 168.7 |
| 49 | 1943.9 | 2.6 | 10.3 | 23.3 | 41.6 | 65.4 | 94.9 | 130.4 | 172.2 |
| 50 | 1908.2 | 2.6 | 10.5 | 23.7 | 42.4 | 66.7 | 96.8 | 133.0 | 175.8 |

The bumper beam 14 is fabricated of ultra-high strength steel, such steel being characterized as having a minimum yield strength of 100 ksi (100,000 pounds per square inch). Preferably, the ultra-high strength steel used has a yield strength of at least 120 ksi with a plan view sweep value of above 10. The bumper beam is formed by the conventional manufacturing method of rollforming, rollforming being the preferred technique for use in connection with forming the bumper beams of ultra-high strength steel. Such beams have been produced with sweep values of 15, 30, and 40.

FIG. 3 illustrates the cross-sectional configuration of the bumper beam 14. As will be noted, the bumper beam has a box-like configuration which results in high strength and dimensional stability. Before forming the bumper beam 14 by the rollforming process, the beam is in the shape of a straight tubular section, preferably seamless tubing. Typically, the bumper beam may have a width of about 3¼ inches and a height of about 4⅜ inches.

The cross-sectional shape of the bumper beam 14 is important. As will be noted, the bumper beam comprises an upper wall 28 and a lower wall 30. Each of the upper wall 28 and lower wall 30 has an outer edge 32, 34 and an inner edge 36, 38. An outer wall 40 interconnects the outer edges 32, 34 of the upper and lower walls 28, 30. The outer wall 40 faces away from the vehicle 10, facing forwardly in the case of the front bumper and rearwardly in the case of a rear bumper. An inner wall 42 interconnects the inner edges 36, 38 of the upper and lower walls 28, 30.

An inner portion 44 of the upper wall 28 is angled downwardly into connection with the inner wall 42 and an inner portion 46 of the lower wall is angled upwardly into connection with the inner wall 42. The inner portions 44, 46 are substantially equal in width, preferably extending from about the mid-point of the upper and lower walls 28, 30 respectively. The downward angle of the inner portion 44 of the upper wall 28 is substantially the same number of degrees of the upward angle of the inner portion 46 of the lower wall 30 although of reverse direction. The angle referred to is, of course, the angle which the inner portions 44, 46, make with a horizontal plane. This angulation results in the inner wall 42 being narrower than the outer wall 40 as can be seen in FIG. 3.

The outer and inner walls 40, 42 are substantially vertically oriented when the bumper beam is mounted on the vehicle 10. As will be noted in FIG. 3, an indentation 48, 50 is present centrally of each outer and inner wall 40, 42. These indentations are dictated by the rollforming processing means. However, in addition, the indentations serve structurally to aid in resisting bending of the bumper beam 14 when it is impacted. The upper and lower wall segments 52, 54 between the inner portions 44, 46 and the outer edges 32, 34 are substantially horizontally oriented when the bumper beam 14 is mounted on vehicle 10.

The angulation of the inner portions 44, 46 is of great value in the roll formation of the bumper beam 14. The angle of the inner portions 44, 46 permits forming the bumper beam 14 into the desired sweep without undue stretching of the outer wall 40. Such stretching in the past has caused deterioration of the outer walls of bumper beams to the point where the desired sweep value has not been obtained in amounts above 10. In the rollforming process, the portion of the bumper beam 14 defined by the inner portions 44, 46 undergoes compressive deformation adequate to prevent undue stretching of the outer wall 40. The angulation of the portions 44, 46 is also of value in directing a stream of cooling air behind the bumper beam 14.

Bumper structures 12, 56 are mounted on the forward end 58 and rearward end 60 of the vehicle 10. Illustratively, mounting of the front bumper beam 14 is illustrated in FIGS. 2 and 5

Reference is now made to FIGS. 2 and 5. The vehicle 10 includes framing structure which includes a pair of transversely spaced apart side rails 62, 64. The elongated bumper beam 14 is rigidly secured to the side rails 62, 64 at spaced apart locations along the length of the bumper beam adjacent the outer ends thereof. This is accomplished by means of mounting means which includes structure for adjusting the position of the bumper beam 14 vertically, transversely, and longitudinally with respect to the vehicle 10.

The mounting means, generally indicated at 66, 67 each include a first bracket 68 having a central body 70 from which a pair of spaced apart lateral flanges 72, 74 extend. As will be noted, one of the lateral flanges 72 is substantially flush with the plane of the central body 70 while the other lateral flange 72 is positioned forwardly thereof by means of a web 76. The lateral flange 72 is angled inwardly of the vehicle 10. This configuration accommodates the sweep of the bumper beam 14. Each lateral flange 72, 74 has a pair of openings 78, 80 and 82, 84 therein. The bumper beam 14 is provided with transversely extending slots 86, 88 and 90, 92 which register with the openings 78, 80 and 82, 84 when the first bracket 68 is pressed against the inner wall 42. A plurality of bolt 94 and nut 96 structures are extended through the slots and openings to secure the first bracket 68 to the bumper beam. As will be appreciated, the slots 86, 88, 90, 92 permit transverse adjustment of the bumper beam 14 relative to the first bracket 68. The first bracket 68 is ultimately connected to the side rail 62, thus this adjusting feature permits transverse adjustment of the bumper beam with respect to the vehicle 10.

A second bracket 98 is provided for attachment to the first bracket 68 and to the side rail 62. The second bracket 98 has a central body 100 from which extend a pair of spaced apart vertical flanges 102, 104. The vertical flanges 102, 104 each have a vertically extending slot 106, 108 therein. The central body 70 of the first bracket 68 has a pair of spaced apart transversely extending slots 110, 112 therein. The slots 106, 108 are in registry with the slots 110, 112 when the second bracket 98 is pressed against the first bracket 68. A nut 116 and bolt 114 extends through each pair of registering slots and secure the brackets together. As will be appreciated, the slots 106, 108 and 110, 112 permit both transverse and vertical adjustment of the two brackets with respect to each other and thus the same adjustment of the bumper beam 14 with respect to the vehicle 10.

The central body 100 of bracket 98 is in the form of a box-like structure which is received within the tubular side rail 62 as shown in FIG. 2. An opening 118 is provided in upper wall 120. A nut 122 is secured to the upper wall 120 in registry with the opening 118, as by welding. The side rail 62 has a longitudinally extending slot 124 provided in upper wall 126. A bolt 128 extends through slot 124 into threading engagement with nut 122 to secure the second bracket 98 to the rail 62. The slot 124 permits longitudinal adjustment of the second bracket 98 with respect to the rail 62 and thus longitudinal adjustment of the bumper beam 14 with respect to vehicle 10.

As previously mentioned, the bumper structure 12 includes the bumper beam 14, facia 16, and foam material 18. This structure is best illustrated in combination in FIGS. 1, 6, 7, and 8.

The facia 16 is basically provided for ornamental purposes although it does serve as a protective structure. As will be noted in FIG. 6, the upper portion of the facia overlies the layer of foam material 18 and bumper beam 14 while the lower portion is free-standing. The facia 16 is attached to vehicle structure 130 by means of a plurality of fasteners 132 spaced apart on the lower edge thereof as illustrated in FIG. 6. Similar fastening may be used at the upper end of the facia 16 as necessary. An elongated angle member 134 is secured to the upper inner edge of the facia 16 by means of a plurality of spaced apart rivet-like structures 136 as illustrated in FIG. 7. The angle member 134 is used to secure the foam material 18 in place by means of a plurality of spaced apart fasteners 138 as shown in FIG. 6.

Facia 16 is typically fabricated of a resilient plastic material which provides a finished appearance for the vehicle. The facia is conventionally manufactured of a suitable reaction injected molded plastic material known as RIM of an elastomeric urethane with a selected density and degree of flexibility. The facia can be made with fillers for performance characteristics such as increased rigidity and tensile strength as desired. As previously mentioned, the facia has a plurality of vents 20, 21, 22, 23, 25 which provide a desirable appearance feature as well as functionally allowing air to pass through the bumper structure for its cooling effect. The vents 21, 23 overlie the bumper beam 14. Therefore, the bumper beam 14 is provided with registering openings to permit passage air therethrough. As illustrated in FIG. 7, openings 140, 142 are provided behind the vent 23. Similar openings 143, 145 are provided behind the vent 21.

The foam material 18 is fabricated as an elongated member of, for example, a polypropylene with selected filler materials. The foam material 16 serves as an energy absorber along with the bumper beam 14. The foam material is capable of being compressed by a minor impact of the bumper structure 12 with another vehicle or fixed structure. After impact, the bumper beam foam material will re-expand to its original shape thereby preserving the integrity of the bumper structure appearance.

The provision of a bumper beam 14 fabricated of ultra-high strength steel permits a variation in the usual configuration of the foam material 18. The impact requirements for bumper structures are most severe at the center of the bumper structure and less severe at the end portions thereof which must absorb only angular impact. This impact is easily absorbed by the bumper beam 14. Therefore, it is possible to reduce the thickness of the foam material near the end portions of the bumper structure. As will be noted by comparison of the thickness of the foam material at the center portion of the bumper structure as illustrated in FIG. 7, and the thickness of the foam material near the end portions of the bumper structure as illustrated in FIG. 8, the thickness of the foam material is gradually reduced from the center portion towards the longitudinal end portions. This is an important feature in that it results in cost savings as well as providing a wider scope of ornamental design of the bumper structure.

We claim:

1. A vehicle bumper structure comprising an elongated rollformed tubular bumper beam, the bumper beam being fabricated of ultra-high strength steel and having a plan view sweep value of more than 10, the bumper beam having an outer wall and an inner wall; a relatively thick layer of energy absorbing foam material overlying the outer wall of the bumper beam, the layer of foam material being thickest at a central portion of the bumper beam and decreasing in thickness towards longitudinal ends of the bumper beam; and an exterior facia overlying the layer of foam material.

2. A vehicle bumper structure as defined in claim 1, wherein the bumper beam has a cross-sectional configuration comprising an upper wall and a lower wall, each of the upper wall and lower wall having an outer edge and an inner edge, an outer wall interconnecting the outer edges of the upper and lower walls, and an inner wall interconnecting the inner edges of the upper and lower walls, an inner portion of the upper wall being angled downwardly into connection with the inner wall and an inner portion of the lower wall being angled upwardly into connection with the inner wall.

3. The vehicle bumper structure as defined in claim 2, wherein said inner portion of the upper wall and said inner portion of the lower wall of the bumper beam are substantially equal in width.

4. The vehicle bumper structure as defined in claim 3, wherein said inner portion of the upper wall and said inner portion of the lower wall of the bumper beam extend from about a midpoint of the upper wall and lower wall respectively.

5. The vehicle bumper structure as defined in claim 2, wherein the inner portion of the upper wall of the bumper beam is angled downwardly substantially the same number of degrees as the inner portion of the lower wall is angled upwardly.

6. The vehicle bumper structure as defined in claim 2, wherein said inner and outer walls of the bumper beam are substantially vertically oriented.

7. The vehicle bumper structure as defined in claim 2, wherein a substantially horizontally oriented portion of the upper wall extends between said downwardly angled inner portion and the outer wall, and a substantially horizontally oriented portion of the lower wall extends between said upwardly angled inner portion and the outer wall, the inner wall being narrower than the outer wall.

8. The vehicle bumper structure as defined in claim 1, wherein the ultra-high strength steel has a yield strength of at least 120 ksi.

* * * * *